United States Patent [19]

Natter

[11] 4,010,063
[45] Mar. 1, 1977

[54] PEDAGOGIC THERMAL PULSE SEALING APPARATUS

[76] Inventor: Howard Natter, c/o Honatech, Inc. 400 Walnut St., Yonkers, N.Y. 10701

[22] Filed: Apr. 2, 1975

[21] Appl. No.: 564,411

[52] U.S. Cl. .................................. 156/510; 83/544; 83/607; 156/583

[51] Int. Cl.² ...................... B32B 31/06; B26D 5/08

[58] Field of Search ............... 156/380, 510, 583; 83/607, 609, 544, 464, 452; 219/10.53

[56] References Cited

UNITED STATES PATENTS

| | | | |
|---|---|---|---|
| 884,219 | 4/1908 | Scates | 83/607 |
| 1,511,810 | 10/1924 | Gwynn | 156/583 |
| 2,185,985 | 1/1940 | Lund | 83/607 |
| 2,254,374 | 9/1941 | Laukhuff | 83/544 |
| 2,324,751 | 7/1943 | Williams et al. | 83/452 |
| 2,581,977 | 1/1952 | Spalding et al. | 156/583 |
| 2,802,086 | 8/1957 | Fener | 156/583 |
| 2,927,620 | 3/1960 | Elliott | 156/583 |
| 3,703,427 | 11/1972 | Sellers et al. | 156/380 |

*Primary Examiner*—Douglas J. Drummond
*Attorney, Agent, or Firm*—Natter & Natter

[57] ABSTRACT

A pedagogic sealing apparatus for seaming thermoplastic layers includes a sealing station and a trimming station. The sealing station includes a movable platen jaw which compresses the layers against a fixed jaw. Current flow through a resistance ribbon in the fixed jaw elevates the temperature of the layers to provide a fused seam between the layers. An indicator is provided to apprise the student of the termination of a preselected duration heating pulse and the commencement of a cooling cycle. The platen jaw is heated by a resistance ribbon optionally actuated conjunctively with the fixed jaw ribbon to seal layers which require additional heat to fuse their interface.

9 Claims, 7 Drawing Figures

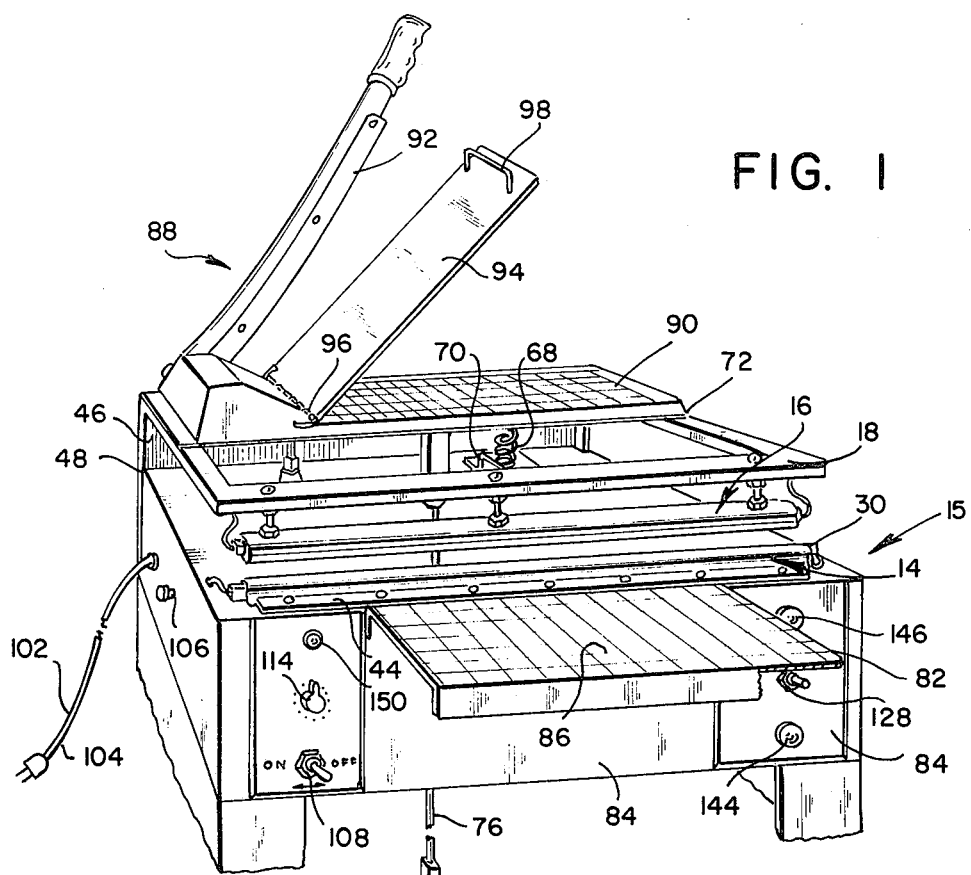

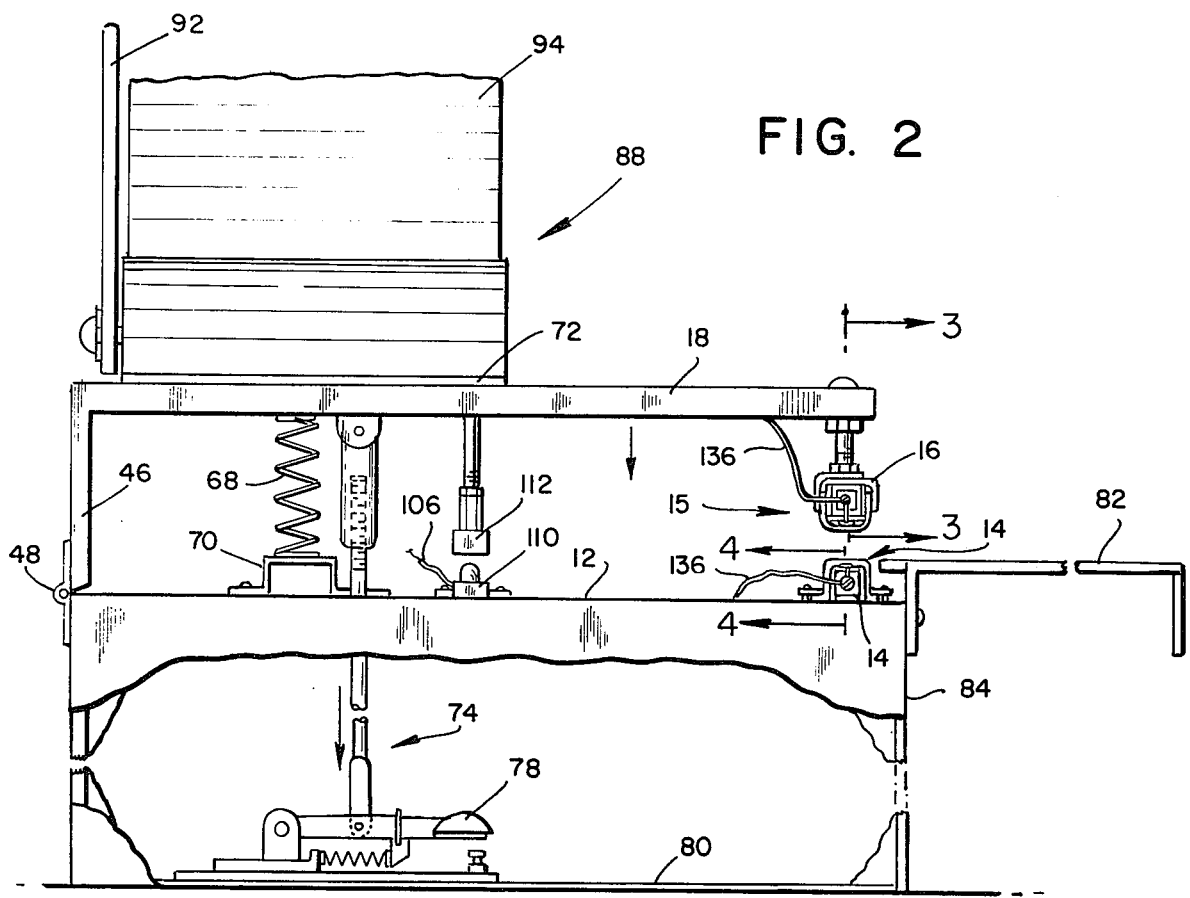
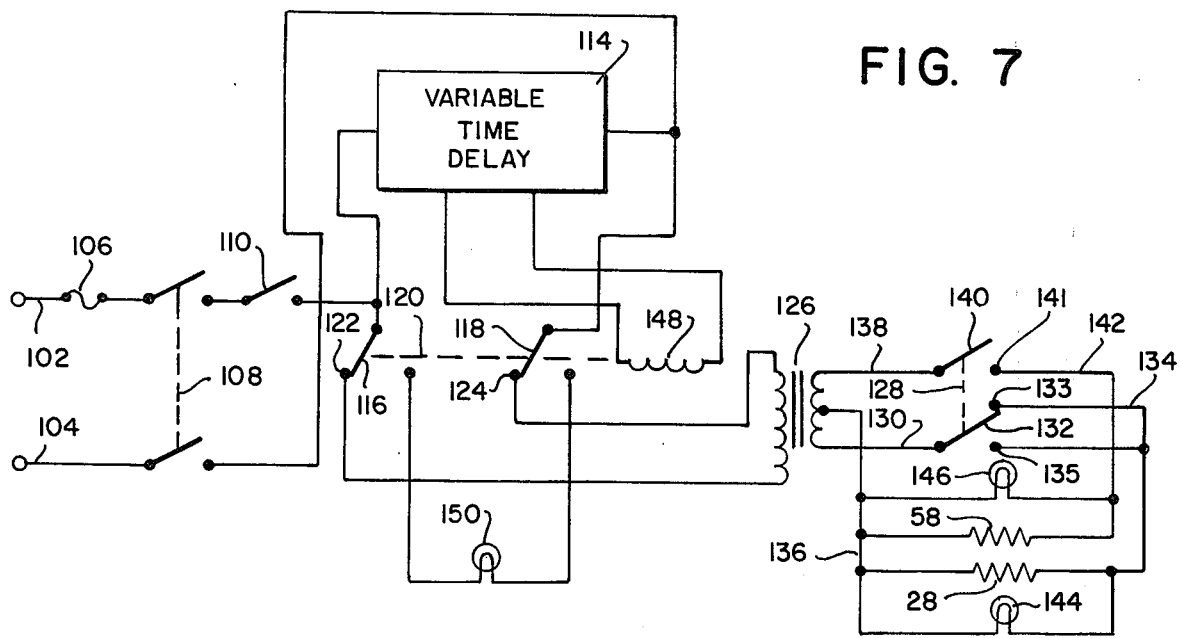

PEDAGOGIC THERMAL PULSE SEALING APPARATUS

BACKGROUND OF THE INVENTION

1. Field of the Invention

This invention relates to pedagogic apparatus adapted for demonstration in the theory of heat sealing and the operation and use of thermal pulse sealing machines.

2. Brief Description of the Prior Art

Plastic sealing through various welding techniques has traditionally been accomplished with the application of heat and pressure. The heat has been generated by various sources such as infrared radiation, dielectric, ultrasonic, and electrical resistance, while pressure is required to force the heated surfaces together to achieve the bond.

The term impulse sealing as been used to designate the technique of bonding or welding relatively thin films utilizing pressure and a very rapid heat pulse generated by a resistance element. The films were then cooled while maintaining compressive pressure. Various thermoplastic films which have been bonded utilizing impulse sealing include polystyrene, polyethylene, polypropylene, polyvinyl chloride and the like.

Operating demonstration equipment has been desirable when instructing students in the theory and practice of plastic fabrication technology. Although commercial production machinery have been used for demonstration, several disadvantages have been encountered with the use of such equipment in the primary and secondary school pedagogic environment wherein the machinery are operated by unfamiliar students as part of their course of study.

Commercial impulse sealers were generally designed for application in seaming thin films and characteristically employed an extremely short heat cycle generated by a short impulse of current flow through a resistance ribbon. The rapid heat cycle provided inherent limitations on heat generating capacity, thus restricting the thickness of the layers to be bonded. Additionally, the short current impulse (generally not longer than 2 seconds) inhibited student perception and cognizance of the precise heating cycle.

Production impulse sealers additionally lacked the versatility to perform satisfactorily in a pedagogic environment wherein multiple custom projects were constructed. Typically, prior sealers were provided with particular jaw lengths usually not appreciably greater than the dimension of the films to be sealed in production. In the school shop, however, student projects were quite diversified and while one student's project was the construction of a small article, e.g. a billfold, another student's project might very well have been a larger article, e.g. a tote bag, or one wherein thick layers of thermoplastic materials were to be bonded.

When relatively thick layers, i.e. over 10 mils total thickness, of thermoplastic material were bonded, the maximum heat generated in a single impulse cycle of a commercial impulse sealer was insufficient. Attempts to avoid this limitation included multiple rapid recycling to generate sufficient heat. With the layers of work pieces absorbing the heat generated, heat was not effectively dissipated in areas of the jaws not contacted by the work pieces. High temperature areas resulted in causing severe burning or scorching of protective sheaths which covered the jaws.

SUMMARY OF THE INVENTION

A pulse thermal sealing apparatus adapted for pedagogic application includes a platen jaw and a fixed jaw between which layers of thermoplastic work piece are placed. Each jaw includes an electrical resistance ribbon with the ribbons of both jaws energized in applications wherein thick layers are to be seamed and only one of the ribbons energized when the apparatus is used to seam relatively thin films. Variable thermal pulse cycles of longer duration than commercial impulse sealers are utilized.

A work project alignment board is provided in front of the jaws and a trimming board having an ansated safety clamp is positioned rearwardly of the jaws. Indicators are provided to apprise the student of the termination of the heating pulse, commencement of the cooling cycle, and which heating ribbon is operational.

From the foregoing, it will be appreciated that it is an object of the present invention to provide a pedagogic pulse thermal sealing apparatus of the general character described which, however, is not subject to the disadvantages aforementioned.

It is a further object of the present invention to provide a pedagogic pulse thermal sealing apparatus of the general character described which is particularly well suited for instruction in the theory of heat sealing technology.

It is a further object of the present invention to provide a pedagogic pulse thermal sealing apparatus of the general character described which provides a variable thermal pulse duration substantially greater than that of conventional impulse sealers.

It is a further object of the present invention to provide a pedagogic pulse thermal sealing apparatus of the general character described which includes two heating jaws, one of which is optionally energizable to provide a supplemental heat pulse to the obverse face of the work piece.

Yet another object of the present invention is to provide a pedagogic pulse thermal sealing apparatus of the general character described which includes indicators for apprising the student of the particular phases of the heat sealing cycle and the operation of particular components.

Yet another object of the present invention is to provide a pedagogic pulse thermal sealing apparatus of the general character described which includes means for assisting in work piece alignment and for safely finishing the work piece after sealing.

Other objects of the invention in part will be apparent and in part will be pointed out hereinafter.

With these ends in view, the invention finds embodiment in certain combinations of elements and arrangements of parts by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention, FIG. 1 is a perspective illlustration of a pedagogic pulse thermal sealing apparatus constructed in accordance with and embodying the invention with portions thereof broken away for clarity, FIG. 2 is a side elevational view thereof also with portions broken away for clarity, FIG. 3 is an enlarged fragmentary sectional view through a sealing jaw of the apparatus the same being taken substantially along the line 3—3 of FIG. 2 and illustrating the manner in which an optional heating element is mounted to the jaw, FIG. 4 is an enlarged fragmentary sectional illustration through another sealing jaw, the same being taken substantially along the line 4—4 of FIG. 2 and similarly illustrating the manner in which a heating element is secured, FIG. 5 is a sectional view through the jaw illustrated in FIG. 3 and a supporting frame, the same being taken substantially along the line 5—5 of FIG. 3 and illustrating the manner in which the jaw is positioned to depend from the frame, FIG. 6 is a sectional view through the jaw illustrated in FIG. 4, the same being taken substantially along the line 6—6 of FIG. 4 and illustrating the manner in which the jaw is anchored to the apparatus, and FIG. 7 is a schematized illustration of an exemplary circuit employable in the apparatus and including a variable time delay for energizing the resistance elements.

DETAILED DESCRIPTION OF THE INVENTION

Referring now in detail to the drawings, the reference numeral 10 denotes generally a pulse thermal sealing apparatus constructed in accordance with and embodying the invention. The apparatus 10 generally comprises a pair of sealing jaws between which selected layers of work piece are positioned. To effect a seal between the layers, one of the jaws is mounted for reciprocal movement toward the other jaw and upon the movable jaw achieving a position applying compressive force against the layers of work piece, a switch actuates a heating element in one or optionally both of the jaws.

With reference now to FIGS. 1 and 2, it will be appreciated that the apparatus 10 comprises a table or chassis bed 12 having an anvil or a fixed sealing jaw 14 secured to the forward end thereof and a platen jaw 16 positioned above and in registry with the fixed jaw 14. The jaws 14, 16 are in an area generally designated as a sealing station 15. The platen jaw 16 depends from a substantially horizontal frame 18 which is hingedly mounted at its rear to the bed 12.

From an observation of FIGS. 4 and 6 it will be seen that the jaw 14 generally comprises an elongated metal bar 20 having a plurality of internally threaded sockets 22 positioned on the undersurface thereof for the purpose of anchoring the bar 20 to the bed 12. A plurality of bolts 24 extend from the undersurface of the bed 12 and through apertures in the bed registered with the threaded sockets 22.

A sheath 26 of electrically insulating yet heat resistant material, e.g. glass fiber cloth, is emplaced over the top of the bar 20 and around the sides thereof. The sheath 26 serves to insulate the bar 20 from a conventional heating ribbon 28 through which pulses of electrical current are transmitted for the purpose of generating a pulse heat output. The ribbon 28 is formed of commercially available high resistivity alloy such as those marketed under the trademarks Nichrome and Calrod and is desirably tensioned over the length of the bar 20 on the upper surface thereof and along the axial center.

In order to maintain the resistance ribbon 28 under tension and provide appropriate terminals for the connection of electrical leads thereto, each end of the bar 20 includes a vertical channel 30 having a generally horizontal socket or well 32 extending axially into the bar 20. A terminal block 34 of a dielectric material is positioned within the channel 30. The block 34 includes a horizontal post 36 extending into the well 32. Each of the terminal blocks 34 is urged in a direction away from the well by a coil spring 38 seated within the well and about the post 36. A relatively rigid generally L-shaped lug 40 extends from each end of the ribbon 28 to a contact on the outer face of each terminal block 34. The lugs 40 are urged outwardly by the terminal blocks, thus maintaining the ribbon 28 under tension.

To provide a suitable surface for transmitting heat generated by the ribbon 28 to the work piece, a covering sheath 42 is positioned over the ribbon 28. The sheath 42 is formed of an electrically insulating yet heat resistance material, e.g. glass fiber cloth. The cloth is impregnated with a release agent or with a material which provides a low coefficient of friction, such as polytetrafluoroethylene, to prevent adhesion of the work piece to the jaw. Since the fixed jaw 14 functions in the nature of an anvil against which the work piece is compressed, the sheaths 26, 42 are desirably non-compressible.

The sheath 42 overlaps the sides of the bar 20 and is held fast between the bed 12 and a pair of elongated clamping plates 44 mounted to the bed adjacent the front and rear sides of the bar 20. It should be appreciated that the securely positioned sheath 42 serves to retain the ribbon 28 and sheath 26 in position.

As mentioned previously, the platen jaw 16 depends from a substantially horizontal frame 18 and is mounted for reciprocal movement toward the fixed jaw 14. The frame 18 comprises a generally U-shaped tubular element positioned in a plane substantially parallel to the bed 12. The ends of the frame 18 are secured to a perpendicularly oriented rear wall 46 which is pivotally connected to the bed 12 by a hinge 48.

To mount the platen jaw 16 to the bight of the U-shaped frame 18, a plurality of apertures are formed in the frame and through each of which a bolt 50 extends. Each bolt 50 is secured to the frame with the frame between a nut 51 and the bolt head. The end of the bolt 50 is received in a threaded socket 52 formed in a metal bar 54 substantially identical to the bar 20 of the fixed jaw.

A strip of compressible elastomeric material such as a silicone rubber pad 56 extends across the lower face of the bar 54. The pad 56 serves not only as a cushioning element but as an electrical and a heat insulating layer. The pad 56 retards heat dissipation through the bar 54 and serves to electrically isolate a heating ribbon 58 positioned across the jaw 16 similar to the heating ribbon 28 of the lower jaw 14. The ribbon 58 is desirably of higher resistivity than the ribbon 28 with a resultant lower rate of heat generation. The ribbon 58 is mounted to the bar in a somewhat tensioned state in a manner identical to that of the ribbon 28 through the employment of identical insulating blocks seated within the channels formed in the ends of the bar 54.

A cover sheath 60 of electrically insulating heat resistant material treated to retard adhesion substantially identical to the cover sheath 42 extends around the sides of the bar 54 and retains the pad 56 and ribbon 58. To retain the sheath 60, a pair of angle plates 62, 64 are mounted to overlie the opposite sides of the bar 54. Oversized apertures are provided on the upper faces of each angle plate with the upper face of one angle plate 62 overlying the face of the other angle plate 64. The apertures in the plates are in substantial registry with and are of larger dimension than the threaded socket 52 in the bar 54. A nut 66 engaged on each bolt 50 is employed to tighten against the angle plates after the sides of each angle plate are forced against the sheath 60.

It should also be appreciated that adjustment of the position of the platen jaw 16 may be achieved by rotating the bolts 50 before tightening the nuts 51, 66. Such adjustment may be desirable to compensate for wear of the pressure pad and/or in cnjunction with adjustment of the pedal operating linkage for lowering the platen jaw into operating position.

The frame 18 is maintained in its at rest position with the jaws 14, 16 separated so as to accept and accommodate layers of thermoplastic material therebetween by a coil spring 68 positioned between a bracket 70 secured to the bed 12 and a plate 72 which extends across the legs of the frame 18. An adjustable linkage 74 is provided to urge the frame 18 and the platen jaw 16 downwardly about the hinge 48 and against the bias of the spring 68 to a work position wherein the platen jaw exerts pressure against the layers of work piece. The linkage 74 generally comprises a swivel connection between the plate 72 and a pull rod 76. The rod 76 terminates at a locking pedal 78 of conventional construction which is secured to a floor 80 of the apparatus.

To assist the student in aligning the layers to be seamed, the sealing station 15 includes an alignment board 82 secured to a vertical front panel 84 which extends downwardly from the forward edge of the bed 12. The board 82 preferably includes imprinted or scored alignment indicia 86 on the upper surface thereof. The indicia comprises markings extending both parallel to and perpendicular from the jaw 14. As can be readily observed from FIG. 2, the upper surface of the board 82 extends substantially in the plane of the upper sealing surface of the jaw 14, as a feeding platform for the work piece.

A trimming station 88 is provided for the purpose of finishing the student project. The station 88 is mounted to the plate 72 at the rear of the frame 18 and generally comprises an alignment board 90 upon which the work piece is placed and a cutting blade 92. The cutting blade 92 is pivotally mounted to one end of the board 90 in a manner similar to that of a conventional paper cutter as is the general operation of the station 88.

The station 88, however, includes an ansated clamping panel 94 hingedly joined to the board 90 adjacent the blade end thereof. The panel 94 is maintained in a normally open upwardly slanted position by a spring biased hinge 96.

In order to securely hold the work piece to prevent movement during the downward stroke of the cutting blade 92, the student operator is required to grip the clamping panel 94 by its handle 98 and force the panel 94 downwardly against the bias of the hinge 96 thereby clamping the work piece. It should be appreciated that when the student cuts the work piece by grasping the blade 92 and lowering same, his normally free hand will be employed in grasping the clamp 98 to hold the ansated panel in position. Thus, both of the student's hands will be occupied and the student will therefore be less prone to accidental injury.

Referring now to FIG. 7 wherein a typical electrical circuit employable in the apparatus 10 is shown, the reference numerals 102 and 104 designate leads extending to the AC line voltage. A fuse 106 is positioned intermediate the voltage source and a single throw double pole power supply switch 108 is mounted on the front panel 84.

A normally open single pole, single throw switch 110 closes upon lowering the platen jaw 16 to its operating position wherein pressure is applied against the work piece. For this purpose, the switch 110 is mounted to the bed 12 and an adjustable rod 112 extends downwardly from the plate 72 in registry with the switch. Depression of the foot pedal 78 lowers the frame 18 causing the switch 110 to close to commence the sealing cycle.

With switches 108 and 110 closed, line potential is provided to a variable time delay 114 and movable contacts 116 and 118 respectively of a relay 120. Upon initial actuation, the line voltage is transmitted from the movable contacts 116, 118 through fixed contacts 122, 124 of relay 120 to the primary coil of a stepdown transformer 126.

The transformer output is provided to either the lower heating ribbon 28 or both the lower heating ribbon 28 and the upper heating ribbon 58 by the selected position of a double pole, double throw switch 128. In one position of the switch 128, a potential is provided to a terminal of the ribbon 28 by a lead 130 extending through a movable contact 132, a fixed contact 133 and a lead 134. A common lead 136 which extends from the opposite terminal of the ribbon 28 to a central tap of the transformer secondary coil completes the circuit to allow current flow through the ribbon. Thus, with the switch 128 in the position illustrated, only the ribbon 28 of the fixed jaw 14 is energized upon the lowering of the platen jaw.

If additional pulse heat output is required, the switch 128 is moved to a position wherein a potential is provided to a terminal of the ribbon 58 through a lead 138, a movable contact 140, a fixed contact 141, and a lead 142. The common lead 136 extends from the opposite terminal of the ribbon 58. In this orientation of switch 128, a potential is still provided to the ribbon 28 through the movable contact 132 and a fixed contact 135.

To apprise the student of the particular heating ribbon(s) in operation, an indicator light 144 is positioned in parallel with the ribbon 28 and an indicator light 146 is positioned in parallel with the ribbon 58.

After the variable preselected heat pulse duration has expired, the time delay 114 actuates a coil 148 of the relay 120 causing contacts 116 and 118 to move to a position wherein an indicator light 150 is energized and the transformer 126 is no longer energized. Thus, the indicator light 150 apprises the student that the heating cycle has terminated and that a cooling cycle has commenced. After an appropriate cooling period, the student releases the foot pedal 78 to raise the platen jaw 16 and removes the seamed work piece.

Although the variable time delay 114 and the relay 120 have been shown as separate components, they are commonly available as integrated control networks, such as the solid state timing devices available from Omnetics Incorporated under the stock designation MOR.

It should also be appreciated that the upper heating ribbon 58 is desirably of lower heat generating capacity than the lower heating ribbon 28 for the reason that the resilient pad 56 serves as an insulator separating the ribbon 58 from the metal bar 54 which would otherwise readily absorb the heat generated. On the fixed jaw 14, however, the heating element 28 is separated from the bar 20 only by the sheath 26 and generated heat is more readily dissipated through the bar 20.

It should also be understood that the duration of heat pulse through the jaw 14 or both jaws 14 and 16 acting simultaneously is generally quite longer than periods previously employed with impulse sealers. Generally, impulse sealers were not energized for more than a maximum of 2 seconds, whereas in the present invention both jaws are adjustably operated up to and including a pulse of 30 seconds without the danger of burning the coatings on the sheaths 26, 42, and 60, or the rubber pad 56. The increased heat duration within safe temperature limits permits the apparatus to be utilized in seaming relatively thick layers wherein additional time is required to bring the layer's interface to a bonding temperature.

Thus it will be seen that there is provided a pedagogic pulse thermal sealing apparatus which achieves the various objects of the invention and which is well suited to meet the conditions of practical use.

As various changes might be made in the sealing apparatus as above set forth, it is to be understood that all matter herein described or shown in the accompanying drawings is to be interpreted as illustrative and not in a limiting sense.

Having thus described the invention, there is claimed as new and desired to be secured by Letters Patent:

1. A pedagogic pulse thermal sealing apparatus comprising a sealing station and a trimming station, the sealing station including two jaws, at least one of the jaws including means adapted to provide a pulse heat output, the one jaw including a covering sheath, clamping means adapted to retain the sheath in position, the clamping means comprising a pair of angle plates, one face of each plate extending over an oppposite side of the one jaw and being biased against the sheath, the other face of the plates overlapping one another, the sealing station further including work piece alignment means, the trimming station including a manually actuatable cutting blade, and work piece clamping means, means biasing the clamping means to a first position adapted to receive a work piece, the clamping means being movable to a second position securing the work piece for trimming, the clamping means being unrestrained from returning to its first position in the absence of constant manually applied force, whereby both hands of the operator are engaged during the trimming thus assuring safe operation.

2. A pedagogic pulse thermal sealing apparatus adapted for instruction in the techniques of thermal sealing of work pieces comprising thermoplastic layers, said apparatus comprising a first and a second elongate jaw, means mounting the second jaw for reciprocal movement from a first position substantially parallel to and spaced from the first jaw to a second position biased against the first jaw, the first jaw comprising a bar, an electrical insulation sheath, the sheath covering the bar, an electrical resistor ribbon, the ribbon being positioned on the sheath, and a second electrical insulation sheath, the second sheath covering the ribbon, the second jaw comprising a bar, an electrical and thermal insulation elastomeric pad, the pad covering the bar, an electrical resistor ribbon, the ribbon being positioned on the pad and an electrical insulation sheath, the last mentioned sheath covering the last mentioned ribbon, clamping means adapted to retain one of the ribbon covering sheaths in position, the clamping means including a pair of angle plates, each plate having a pair of perpendicular faces, one face of each plate extending over opposite sides of the bar and being biased against the ribbon covering sheath, the other faces of the plates overlapping one another and means securing the overlapped faces, the apparatus further comprising switching means actuated upon the second jaw attaining its second position, the switching means including means providing an adjustably timed current pulse through one of the ribbons, mode control means, the mode control means adapted to optionally apply an adjustably timed pulse of current through the other ribbon concurrent with the current pulse through the one ribbon, and indicator means adapted to signal the current pulse through each ribbon, whereby the apparatus may be utilized for demonstration and instruction of pulse sealing techniques with extended versatility for the construction of projects having a wide range of work piece thicknesses.

3. A pedagogic pulse thermal sealing apparatus constructed in accordance with claim 2 further including signal means adapted to indicate the termination of the adjustably timed current pulse and the commencement of a cooling cycle, whereby a student operator will be apprised of the various stages of the heat sealing techniques.

4. A pedagogic pulse thermal sealing apparatus adapted for instruction in the techniques of thermal sealing of work pieces comprising thermoplastic layers, said apparatus comprising a fixed jaw, a frame, a platen jaw mounted to the frame for reciprocal movement toward and away from the fixed jaw and means providing a heat pulse through at least one of the jaws, the one jaw including a covering sheath, clamping means adapted to retain the sheath in position, the clamping means comprising a pair of angle plates, one face of each angle plate extending over an opposite side of the one jaw and being biased against the sheath, the other face of the plates overlapping one another, and means securing the overlapped faces, whereby the covering sheath is securely maintained in position.

5. A pedagogic pulse thermal sealing apparatus constructed in accordance with claim 4 further including a trimming station, the trimming station comprising a manually actuatable cutting blade and work piece clamping means, means biasing the clamping means to a first position adapted to receive a work piece, the clamping means being movable to a second position securing the work piece for trimming, the clamping means being unrestrained from returning to its first position in the absence of constant manually applied force, whereby both hands of the operator are engaged in the trimming to thus assure safe operation.

6. A thermal sealing apparatus constructed in accordance with claim 4 wherein the improvement further comprises means optionally providing a heat pulse through the other jaw.

7. A pulse thermal sealing apparatus constructed in accordance with claim 4 further including work piece alignment means, the alignment means including a planar segment, the segment lying in a plane coincident with the fixed jaw, means forming alignment indicia on the segment, the indicia comprising a first set of spaced parallel rulings, the first rulings extending substantially perpendicular to the axis of the fixed jaw, and a second set of spaced parallel rulings, the second rulings extending substantially perpendicular to the axis of the fixed jaw, whereby feeding, positioning, and registration of the work piece is facilitated.

8. A pulse thermal sealing apparatus constructed in accordance with claim 4 further including means adjustably securing the platen jaw to the frame, the securing means including a plurality of means projecting from the frame toward the fixed jaw, each projecting means being fixedly secured to the frame, the platen jaw including a substantially rigid bar having a plurality of sockets, each of the projecting means being adjustably received in a socket and locking means adapted to fix the depth of penetration of each of the projecting means into its respective socket.

9. A thermal sealing apparatus constructed in accordance with claim 8 wherein the projecting means are threaded, the sockets being matingly threaded, and the fixing means comprises a correspondingly threaded nut.

* * * * *